United States Patent
Mhatre et al.

(10) Patent No.: US 11,184,369 B2
(45) Date of Patent: Nov. 23, 2021

(54) MALICIOUS RELAY AND JUMP-SYSTEM DETECTION USING BEHAVIORAL INDICATORS OF ACTORS

(71) Applicant: Vectra Networks, Inc., San Jose, CA (US)

(72) Inventors: Himanshu Mhatre, Mountain View, CA (US); Nicolas Beauchesne, Miami Beach, FL (US)

(73) Assignee: Vectra Networks, Inc., San Jose, CA (US)

( * ) Notice: Subject to any disclaimer, the term of this patent is extended or adjusted under 35 U.S.C. 154(b) by 285 days.

(21) Appl. No.: 16/164,727

(22) Filed: Oct. 18, 2018

(65) Prior Publication Data
US 2019/0149560 A1    May 16, 2019

Related U.S. Application Data

(60) Provisional application No. 62/585,420, filed on Nov. 13, 2017.

(51) Int. Cl.
*H04L 29/06* (2006.01)

(52) U.S. Cl.
CPC ...... *H04L 63/1416* (2013.01); *H04L 63/1425* (2013.01); *H04L 2463/144* (2013.01)

(58) Field of Classification Search
None
See application file for complete search history.

(56) References Cited

U.S. PATENT DOCUMENTS

| | | | | |
|---|---|---|---|---|
| 7,561,569 | B2 * | 7/2009 | Thiede | H04L 43/065 370/252 |
| 7,865,954 | B1 * | 1/2011 | Phoha | G06F 21/552 726/23 |
| 7,921,462 | B2 * | 4/2011 | Rooney | H04L 63/1458 726/23 |
| 8,533,819 | B2 * | 9/2013 | Hoeflin | H04L 63/1416 726/22 |
| 8,555,388 | B1 * | 10/2013 | Wang | H04L 63/1425 726/23 |
| 8,621,065 | B1 * | 12/2013 | Saurel | G06F 21/554 709/224 |
| 8,904,530 | B2 * | 12/2014 | Liu | H04L 63/1416 726/23 |
| 8,966,631 | B2 * | 2/2015 | El-Moussa | H04L 63/1425 726/24 |
| 9,038,180 | B2 * | 5/2015 | Neil | H04L 63/1425 726/23 |

(Continued)

OTHER PUBLICATIONS

European Search Report dated Jan. 23, 2019 for EP Appln. No. 18205554.1.

(Continued)

*Primary Examiner* — Dao Q Ho
(74) *Attorney, Agent, or Firm* — Vista IP Law Group, LLP

(57) ABSTRACT

Disclosed is an improved method, system, and computer program product for detecting hosts and connections between hosts that are being used as relays by an actor to gain control of hosts in a network. It can further identify periods of time within the connection when the relay activities occurred. In some embodiments, the invention can also chain successive relays to identify the true source and true target of the relay.

20 Claims, 17 Drawing Sheets

(56) References Cited

U.S. PATENT DOCUMENTS

| | | | | |
|---|---|---|---|---|
| 9,083,741 B2* | 7/2015 | Powers | | H04L 63/1416 |
| 9,219,744 B2* | 12/2015 | Baliga | | H04L 63/1425 |
| 9,270,693 B2* | 2/2016 | Davis | | H04L 63/1416 |
| 9,294,490 B1* | 3/2016 | Cook | | H04L 63/1458 |
| 9,306,974 B1* | 4/2016 | Aziz | | G06F 9/45558 |
| 9,319,423 B2* | 4/2016 | Jover | | H04W 12/12 |
| 9,448,859 B2* | 9/2016 | Gathala | | H04W 12/1205 |
| 9,519,781 B2* | 12/2016 | Golshan | | H04L 63/145 |
| 9,591,015 B1* | 3/2017 | Amin | | H04L 63/1433 |
| 9,600,656 B1* | 3/2017 | Wellinghoff | | G06F 21/45 |
| 9,625,564 B2* | 4/2017 | Baxley | | H04L 63/1425 |
| 9,635,039 B1* | 4/2017 | Islam | | H04L 63/1425 |
| 9,648,034 B2* | 5/2017 | Bailey | | H04L 67/22 |
| 9,690,635 B2* | 6/2017 | Gupta | | G06F 9/541 |
| 9,705,900 B2* | 7/2017 | Thyni | | H04L 63/1441 |
| 9,705,901 B2* | 7/2017 | Thapliya | | H04L 63/1416 |
| 9,729,571 B1* | 8/2017 | Ferguson | | H04L 63/306 |
| 9,781,139 B2* | 10/2017 | Sofka | | H04L 63/1425 |
| 9,860,278 B2* | 1/2018 | Kurakami | | H04L 63/20 |
| 9,917,852 B1* | 3/2018 | Xu | | H04L 63/1483 |
| 9,942,252 B1* | 4/2018 | Kondaveeti | | H04L 63/0227 |
| 9,979,738 B2* | 5/2018 | Holland | | H04W 12/1204 |
| 10,122,738 B2* | 11/2018 | Sun | | H04L 63/101 |
| 10,122,748 B1* | 11/2018 | Currie | | H04L 63/1441 |
| 10,129,288 B1* | 11/2018 | Xie | | H04L 63/1416 |
| 10,216,695 B1* | 2/2019 | Shankar | | G06F 16/2465 |
| 10,243,981 B2* | 3/2019 | Zhang | | H04L 63/1441 |
| 10,289,473 B2* | 5/2019 | Mendes | | H04L 41/0686 |
| 10,298,611 B1* | 5/2019 | Caldwell | | H04L 63/1433 |
| 10,333,958 B2* | 6/2019 | Huang | | H04L 43/04 |
| 10,404,730 B1* | 9/2019 | Venable, Sr. | | H04L 63/1458 |
| 10,419,454 B2* | 9/2019 | El-Moussa | | H04L 63/1416 |
| 10,432,652 B1* | 10/2019 | Yona | | G06F 21/554 |
| 10,447,711 B2* | 10/2019 | Kaminsky | | G06F 21/31 |
| 10,452,665 B2* | 10/2019 | Poghosyan | | G06F 16/2462 |
| 10,462,159 B2* | 10/2019 | Inoue | | H04L 63/1433 |
| 10,462,169 B2* | 10/2019 | Durairaj | | H04L 41/142 |
| 10,484,422 B2* | 11/2019 | Sternfeld | | H04L 63/1425 |
| 10,516,585 B2* | 12/2019 | Parandehgheibi | | H04L 47/11 |
| 10,560,311 B2* | 2/2020 | Ide | | H04L 43/0823 |
| 10,565,385 B1* | 2/2020 | Ravi | | G06F 21/552 |
| 10,594,711 B2* | 3/2020 | Levin | | H04L 63/1425 |
| 10,601,676 B2* | 3/2020 | Savalle | | H04L 63/0421 |
| 10,616,267 B2* | 4/2020 | Bartos | | H04L 63/1425 |
| 10,623,376 B2* | 4/2020 | Kuperman | | H04L 63/1425 |
| 10,623,429 B1* | 4/2020 | Vines | | H04L 41/14 |
| 10,652,260 B1* | 5/2020 | Rodriguez | | H04L 63/1416 |
| 10,659,477 B2* | 5/2020 | Choi | | H04L 63/1425 |
| 10,725,886 B2* | 7/2020 | Savolainen | | G06F 9/5077 |
| 10,728,281 B2* | 7/2020 | Kurakami | | H04L 63/1425 |
| 10,735,271 B2* | 8/2020 | Byers | | H04L 41/142 |
| 10,735,455 B2* | 8/2020 | Crisler | | H04L 63/1425 |
| 10,771,488 B2* | 9/2020 | Verma | | G06N 3/08 |
| 10,785,235 B2* | 9/2020 | Zavdi | | G06F 21/552 |
| 10,785,258 B2* | 9/2020 | Lam | | H04L 63/1433 |
| 10,791,132 B1* | 9/2020 | Power | | H04L 63/1416 |
| 10,887,323 B2* | 1/2021 | Jang | | H04L 63/1416 |
| 2008/0288330 A1* | 11/2008 | Hildebrand | | G06Q 10/0635 |
| | | | | 705/7.28 |
| 2010/0042834 A1* | 2/2010 | Moret | | H04L 41/0806 |
| | | | | 713/168 |
| 2011/0069622 A1* | 3/2011 | Gintis | | H04L 43/50 |
| | | | | 370/251 |
| 2015/0012751 A1* | 1/2015 | Forster | | H04L 63/029 |
| | | | | 713/171 |
| 2015/0264061 A1* | 9/2015 | Ibatullin | | H04L 63/145 |
| | | | | 726/23 |
| 2015/0264068 A1* | 9/2015 | Beauchesne | | H04L 63/1416 |
| | | | | 726/23 |
| 2015/0264069 A1* | 9/2015 | Beauchesne | | H04L 41/06 |
| | | | | 726/23 |
| 2015/0264078 A1* | 9/2015 | Beauchesne | | H04L 63/1408 |
| | | | | 726/23 |
| 2015/0264083 A1* | 9/2015 | Prenger | | H04L 63/1408 |
| | | | | 726/23 |
| 2015/0312211 A1* | 10/2015 | Beauchesne | | H04L 61/15 |
| | | | | 709/238 |
| 2015/0326589 A1* | 11/2015 | Smith | | H04L 63/02 |
| | | | | 726/1 |
| 2016/0149936 A1* | 5/2016 | Pegna | | H04L 63/1425 |
| | | | | 726/23 |
| 2016/0191551 A1* | 6/2016 | Beauchesne | | G06F 16/285 |
| | | | | 726/23 |
| 2016/0191559 A1* | 6/2016 | Mhatre | | G06F 12/14 |
| | | | | 726/23 |
| 2016/0191560 A1* | 6/2016 | Pegna | | H04L 63/1425 |
| | | | | 726/23 |
| 2016/0191563 A1* | 6/2016 | Beauchesne | | H04L 63/1425 |
| | | | | 726/25 |
| 2016/0210556 A1* | 7/2016 | Simhon | | G06F 11/3452 |
| 2018/0077186 A1* | 3/2018 | Beauchesne | | H04L 63/1425 |

OTHER PUBLICATIONS

Zhu, Ye, et al. "Correlation-based traffic analysis attacks on anonymity networks." IEEE Transactions on Parallel and Distributed Systems 21.7 (2009): 954-967.

Foreign Office Action dated Nov. 27, 2020 for EP Appln. No. 18205554.1.

* cited by examiner

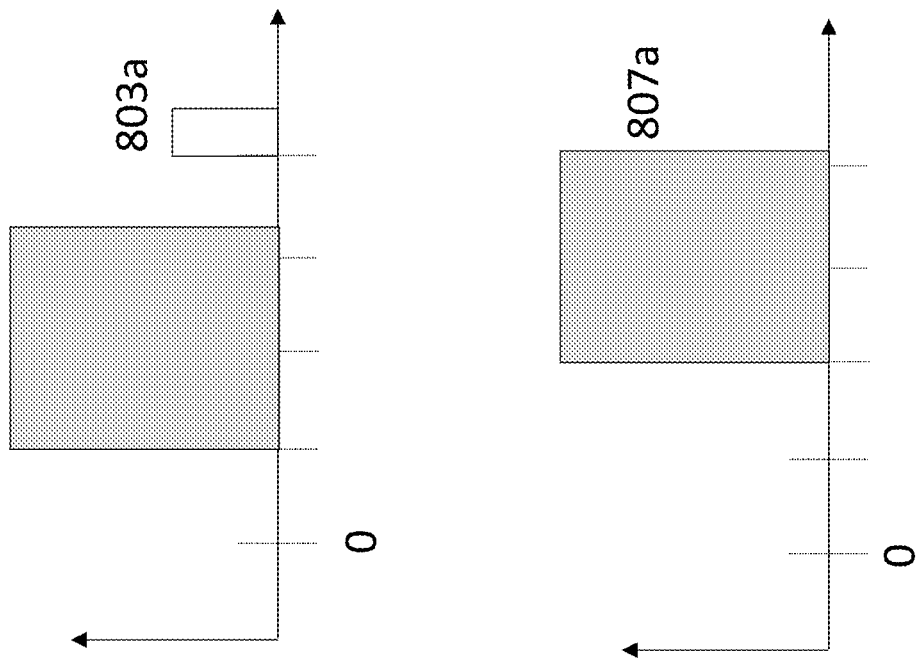

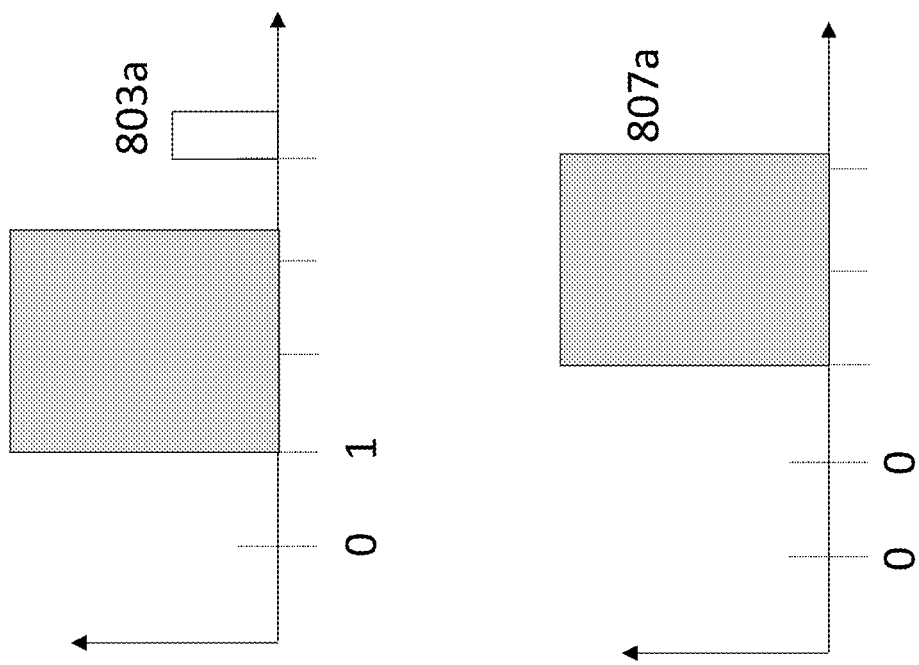

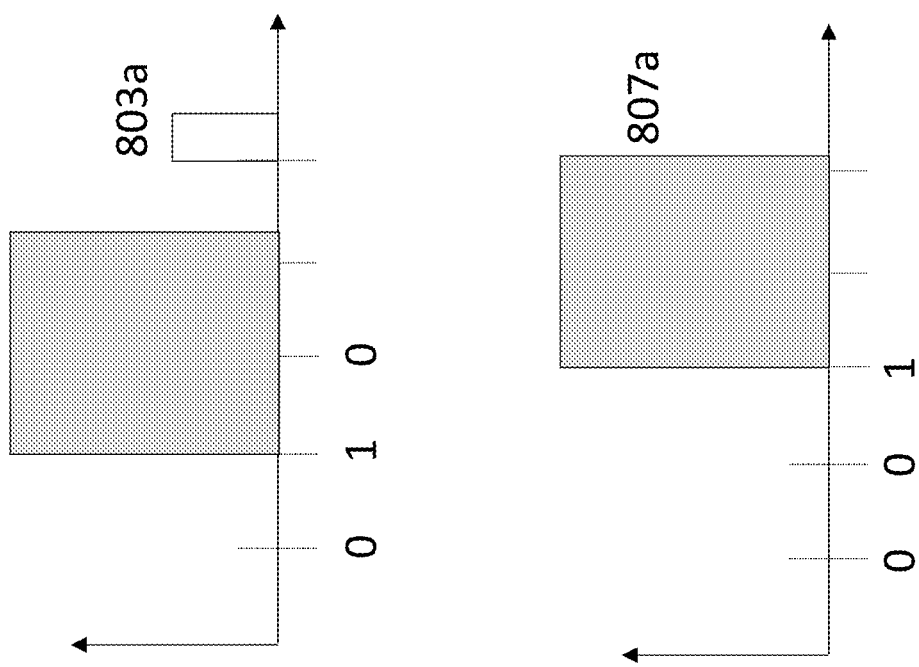

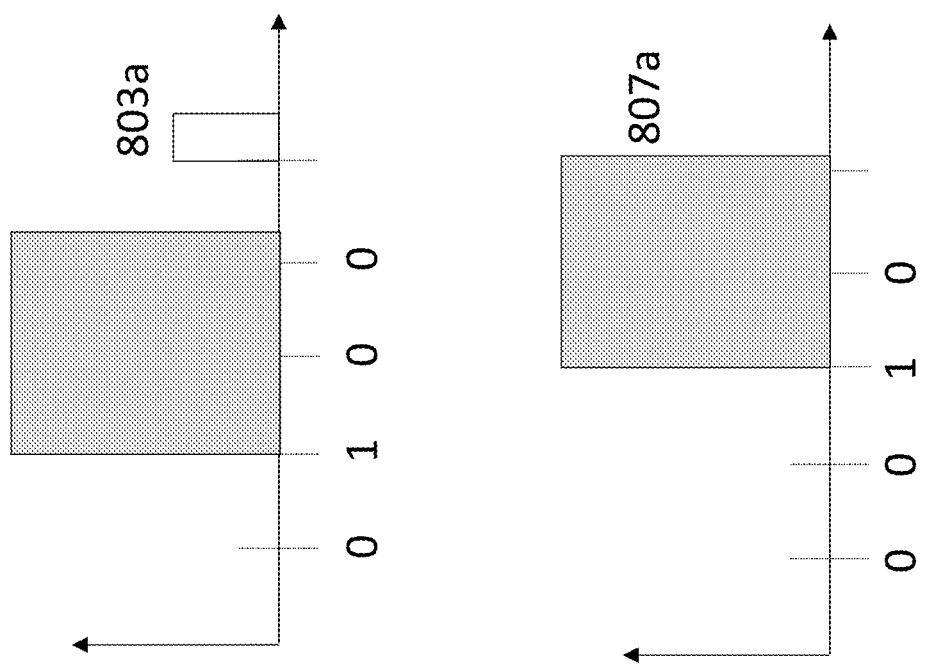

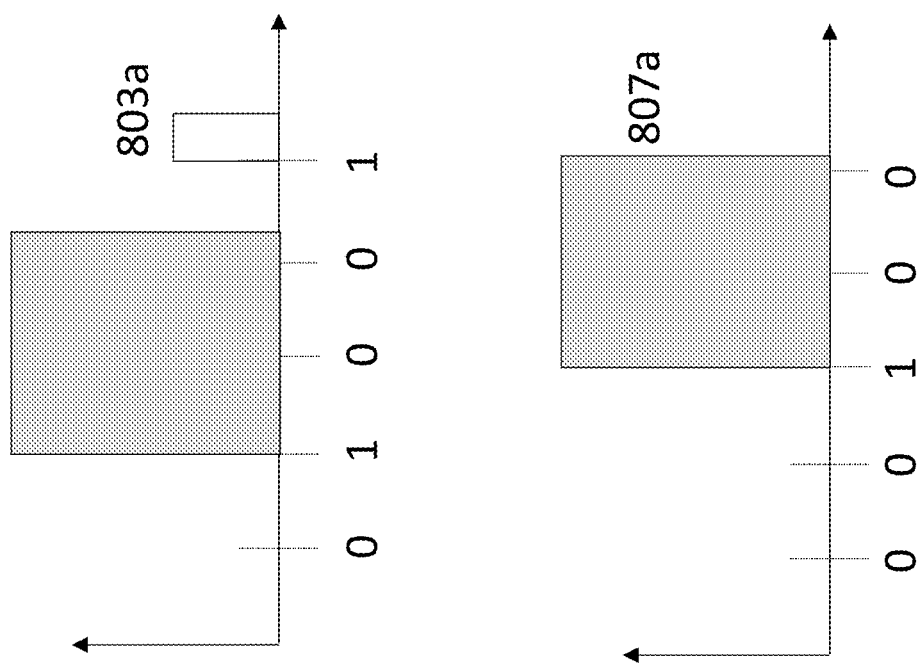

MALICIOUS RELAY AND JUMP-SYSTEM DETECTION USING BEHAVIORAL INDICATORS OF ACTORS

CROSS REFERENCE TO RELATED APPLICATION(S)

This application claims the benefit of priority to U.S. Provisional Application No. 62/585,420 filed on Nov. 13, 2017, which is hereby incorporated by reference in its entirety.

BACKGROUND

In recent years, it has become increasingly difficult to detect anomalous network or malicious activity carried on networks. The sophistication of intrusions has increased substantially, as entities with greater resources, such as organized crime and state actors, have directed resources towards developing new modes of attacking networks.

One fairly harmful type of intrusions pertains to the situation when an outside entity takes control of a host at a given company or organization. When this happens, the host can be controlled and used as a source of attacks against other targets or as a means to exfiltrate data from within the organization. What makes this type of attack difficult to detect is that it can be carried out over time and often is mistaken for "normal" network activity until data about the attack can be analyzed over longer periods of time.

This type of attack may be implemented among criminals in the digital world, where a controlled internal host (e.g., infected computer inside an organization's network) is used in a botnet to carry out attacks on behalf of a bot master or to exfiltrate data from an internal source.

Identification of systems that are being used as relays and jump-systems to gain or delegate access to other systems is also a difficult problem due to the scale of data flowing through large networks as well as lack of visibility to what is actually being communicated between systems. In addition, many systems can communicate using unknown or modified protocols especially those designed for malicious purposes. Furthermore, the protocol on different legs of the relay can be different which makes detection even more difficult.

What is needed is a system and method to effectively and efficiently identify such scenarios where an outside entity uses a relay host to attack or gain access to other hosts within a network.

SUMMARY

The disclosed embodiments provide an approach for identifying network relays and jump-systems by extracting metadata from network traffic and deducing behavioral indicators of an actor accessing a resource. In some embodiments, network packets for a network, such as an internal network, are parsed or processed into flows of unidirectional or bidirectional communications between computing entities inside the network. Metadata that comprises information that describes the network communications without requiring the content or the packets of the network communication to be inspected may then be generated. In some embodiments, the metadata is organized into sessions that correspond to sources and destinations. In some embodiments, a time-series representation of the sessions of metadata is constructed. In some embodiments, the time-series representations of the destination group and the source group are compared with each other to compute scores that reflect the similarity between how close the two given sessions are in their network behavior. In some embodiments, an alarm will be generated if the time-series comparisons exceed a threshold.

Further details of aspects, objects, and advantages of some embodiments are described below in the detailed description, drawings, and claims. Both the foregoing general description and the following detailed description are exemplary and explanatory, and are not intended to be limiting as to the scope of the embodiments.

BRIEF DESCRIPTION OF THE DRAWINGS

FIG. 6A-I illustrates an approach to construct time-series representations of metadata, as according to some embodiments.

DETAILED DESCRIPTION

Figure 1:
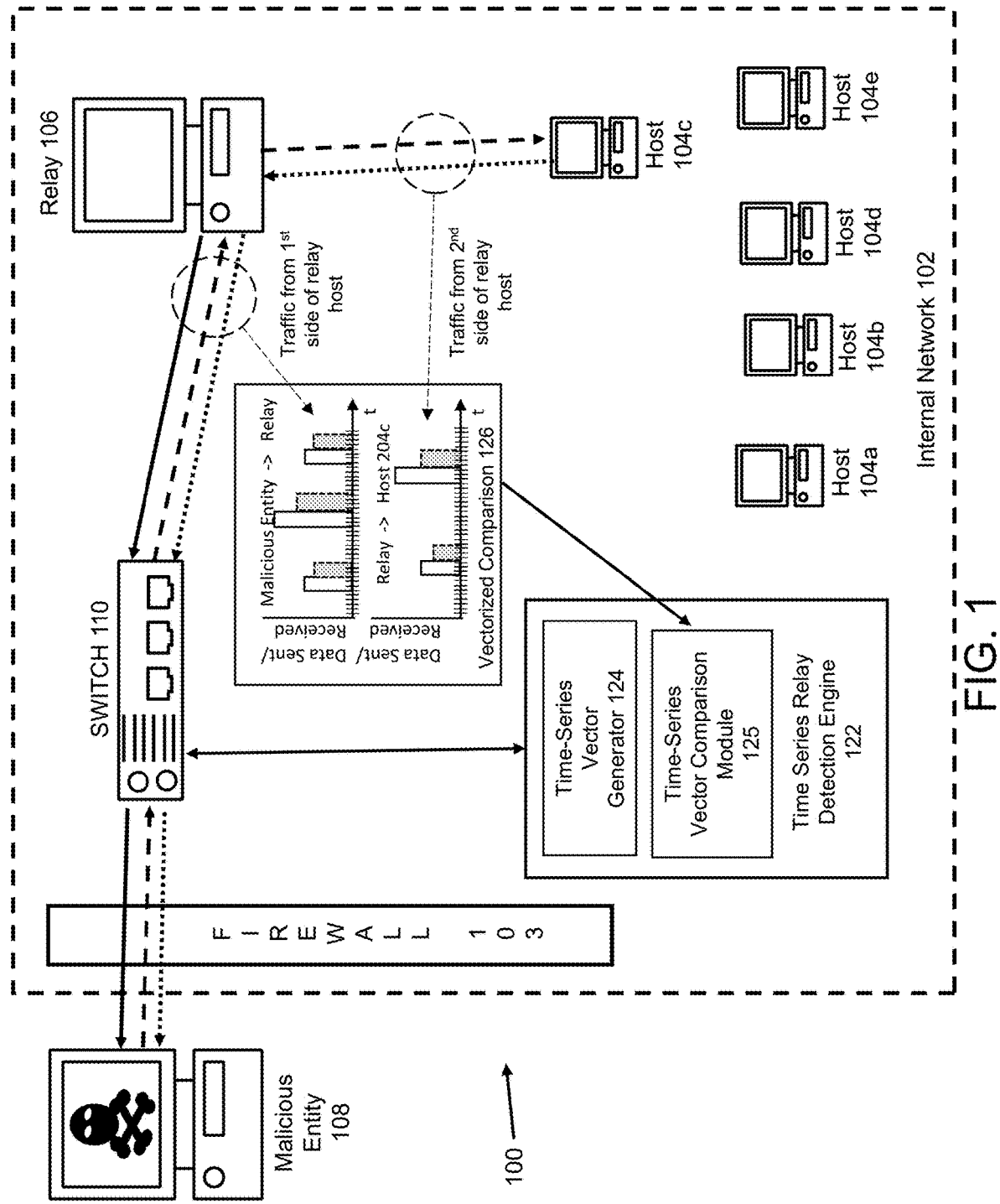
FIG. 1 illustrates an example architecture in which a relay detection module may be implemented to detect network relays and jump-systems, as according to some embodiments.

Various embodiments of the invention are directed to a method, system, and computer program product for identifying network relays and jump-systems by extracting metadata from network traffic and deducing behavioral indicators of an actor accessing a resource.

The drawings illustrate the design and utility of some embodiments of the present invention. It should be noted that the figures are not drawn to scale and that elements of similar structures or functions are represented by like reference numerals throughout the figures. They are not intended as an exhaustive description of how the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiment even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments"

or "in other embodiments" in various places throughout this specification are not necessarily referring to the same embodiment or embodiments.

For illustrative purposes, this document will specifically describe network relays and jump-systems. However, it is noted that while this document illustratively refers to network relays and jump-systems, the invention is indeed broad enough to be applicable to other types of analysis as well. Therefore, network relays and jump-systems are only used for the sake of illustration and as an example.

One harmful type of intrusion pertains to the situation when an outside entity takes control of a host computer inside a company or organization. When this happens, the host can be controlled and used as a source for attacks against other targets or as a source to exfiltrate data from within the organization. What makes this type of attack difficult to detect is the attack could be carried out over time and often mistaken as "normal" network behavior until the data can be analyzed over a longer period of time.

This type of control is often implemented among criminals in the digital world, where the controlled internal host is used in a botnet to carry out attacks on behalf of the bot master outside of the company network or to where the controlled internal host is used as part of targeted attack to exfiltrate data from an internal source.

As noted above, when an actor uses a series of relays or jump-systems to indirectly access a target network resource, indicators of its behavior will permeate across all legs of the relay. Therefore, by measuring and quantifying these indicators from network activity and comparing them, it can be estimated which network traffic connections are controlled by a common actor. In addition, the indicators can also indicate whether the hosts are in fact part of a single long chain of connections connecting one host to another via a series of intermediate hosts.

FIG. 1 illustrates a time-series relay detection engine 122 for detecting relay attacks in an example networking environment 100, as according to some embodiments. There, an internal network 102 comprises one or more hosts (e.g., computing entities, clients, network computers) 104a, 104b, 104c, 104d, and 104e, and a relay 106, that may communicate with one another through networking devices, such as a network switch 110. These hosts generally run software installed with the direct knowledge of the end user of the host or the IT (Information Technology) organization for the company that owns both the network and the host connected to it. As such, these hosts are trusted in the system.

Generally, the internal network 102 is isolated from other networks by network border or security devices, such as a firewall 103. However, if a malicious entity (e.g., external entity attacking) 108 has infected one of the hosts inside the internal network, the malicious entity can use an infected host as a relay 106 to bypass the network firewall 103 and attack other computers inside the network.

For instance, the internal host, e.g., relay 106, may send a first communication (denoted by a solid arrow) to the malicious entity 108 to indicate that the relay is ready to act as a bot for the malicious entity 108. The malicious entity 108 may then send a communication destined for other computers in the network using the infected host as a relay. The malicious entity may send a request (denoted by a dashed arrow) destined for host 104c inside the internal network 102. This communication request is first sent to the relay 106. The relay 106 then relays, redirects, and/or reroutes the request to host 104c, which is the intended destination. Host 104c may then receive the communication, think it is simply a communication directly from another internal computer that is trusted, and send a response (denoted by the dotted arrow) back to the malicious entity 108 by way of the relay 106.

Generally, the firewall 103 prevents external hosts from being able to initiate connections into the company network. However, the firewall does not usually prevent internal hosts from connecting to any other internal hosts using approved protocol such as HTTP (Hypertext Transfer Protocol), DNS (Domain Name System) etc. The firewall prevents an external attacker from directly infecting a host inside the company network—but if an external attacker can control an internal host to act on behalf of the external attacker, then the traditional firewall cannot protect the internal host from becoming a relay inside the network. In some networks, such as campus networks, the firewall may also implement NAT (Network Address Translation) functionality that hides the internal IP (Internet Protocol) address of a host when it is communicating with outside systems.

As such, despite the firewall 103, the malicious entity 108 can use the relay 106 to disguise malicious communications as normal/non-malicious activity occurring between two or more computers in an internal network. If the request (e.g., dotted arrow, FIG. 1) comprises a malicious script, the host 104c is more likely to run the script (and become a bot, or send private information back to the sender) because the malicious script was sent from an entity already inside the internal network 102. Once host 104c is infected, the malicious entity 108 can hide the fact that host 104c is controlled by and in communication with malicious entity 108. Embodiments of the invention provide a relay detection engine that detects these type of network attacks that use relays to bypass network security (e.g., firewall 103).

The time series relay detection engine 122 can be implemented to detect malicious relay communication data flows on the network (e.g., relay attacks denoted by dotted and dashed lines in FIG. 1). The time series relay detection engine 122 comprises at least a time-series vector generator 124 and a time-series vector comparison module 125. In some embodiments, the time series generator and comparison module may not necessarily reside in the same system The time series relay detection engine 122 extracts metadata from network traffic and creates metadata sessions by identifying and organizing a source and destination for hosts in the network. A metadata time series representation of the session is created for a session. Next, the time-series vector generator 124 converts the metadata time series representation into a vectorized representation. This allows a similarity value to be calculated between the two pairs of hosts to determine the similarity of network behavior within a time period for the two pairs of nodes. The time-series vector comparison module 125 compares the similarity value between the pair of nodes 126. If the similarity value passes a certain threshold value, then an alarm is generated and the set of pair of nodes may be indicated as a part of a relay system.

In some embodiments, as illustrated in FIG. 1, the relay detection engine 122 is coupled directly to the network switch 110 through use of a coupler, such as TAP/SPAN. In this way, the relay detection engine may copy and/or analyze the internal network's traffic without disruption or slowing the network down. The detection system can be located in the company network in such a way that it sees the host traffic to the Internet and sees that traffic before NAT changes the internal IP addresses of each internal host's traffic.

Though the relay detection engine is illustrated as a module external to the switch 110, one of ordinary skill appreciates that the engine may also be directly integrated into the switch 110 as a component. Further, in some embodiments, the relay detection engine 122 may be integrated directly into other network devices, such as a firewall 103 or computers/hosts inside the network (e.g., 104a, 104b, 104c, 104d, 104e, 106). The relay detection engine is described in further detail in FIG. 4.

Figure 2:
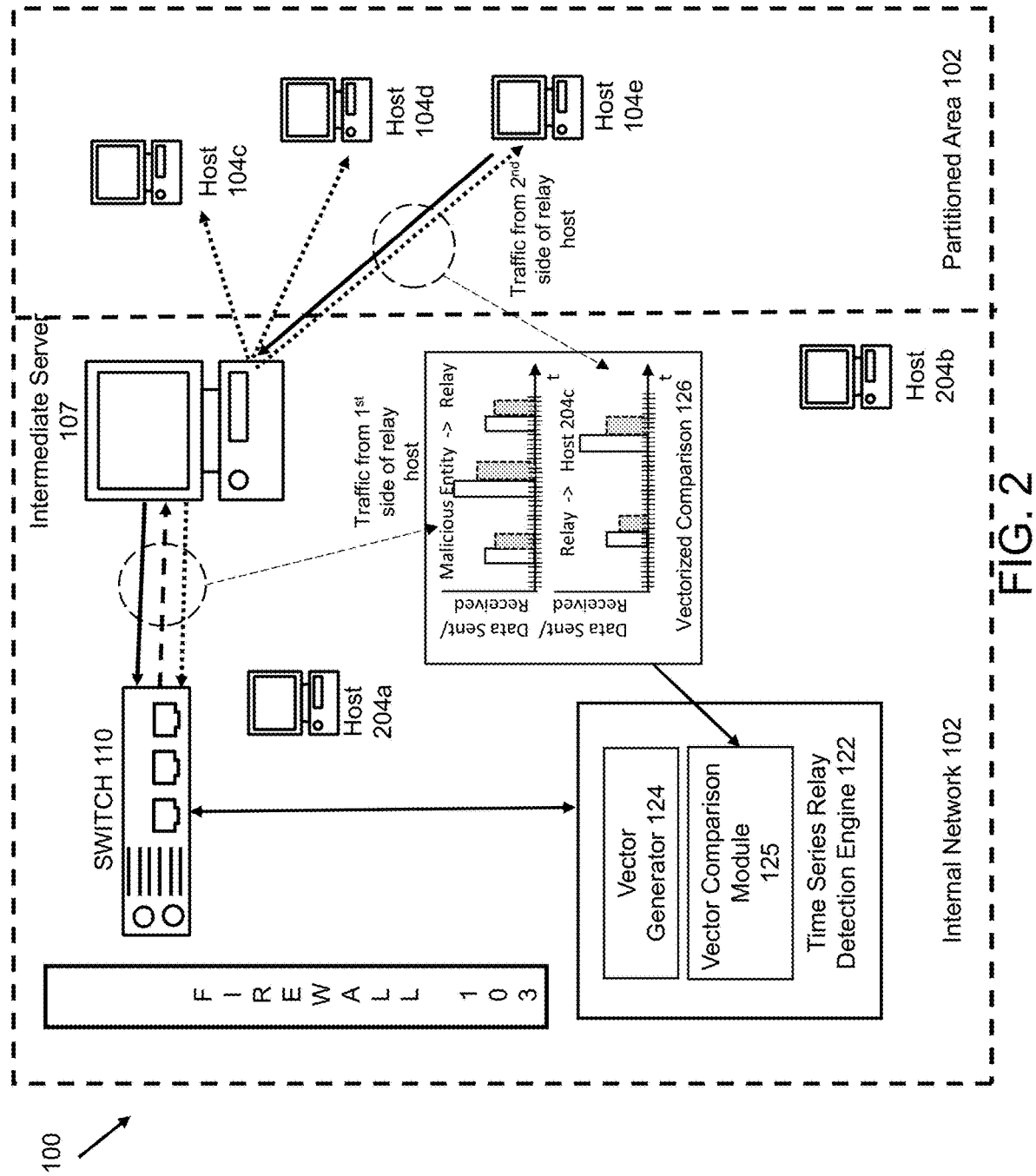
FIG. 2 illustrates another example architecture in which a relay detection module may be implemented to detect network relays and jump-systems that access a partitioned area of the internal network, as according to some embodiments.

FIG. 2 illustrates another type of network attack using intermediate servers as internal relays to access sensitive resources stored inside a partitioned area of the networking environment 100, as according to some embodiments. Here, only certain hosts have access to the resources in the partitioned part of the network. As such, a malicious entity 108 must use the intermediate server 106 to access sensitive or highly confidential resources stored inside the partitioned areas inside the network. In some embodiments, the sensitive resources inside the partitioned area of the network may correspond to database servers or servers that hold financial documents. In other embodiments, the sensitive resources are any resources that may only be accessed through a certain set of hosts.

Further, as illustrated, the malicious entity 108 may use the intermediate server 107 to access sensitive resources, such as internal hosts 104c, 104d, or 104e. The intermediate server 107 has access to the resources in the partitioned area 102 for legitimate purposes. As such, if the network trusts the intermediate server 107, then the malicious entity 108 can use the internal network's credibility/trust-permissions to access the sensitive resources. The malicious entity 108 may then control the intermediate server 106 to access the partitioned area of the network.

Across the two scenarios, the external attacker could perform a variety of tasks, examples of which include DoS (Denial-of-Service) attacks, port scanning, brute force password guessing, data exfiltration, lateral spread of infection, theft/access to sensitive resources, just to name a few. These types of malicious attacks are difficult to defend against for several reasons. Whereas host 104c would highly scrutinize or be suspicious of communications coming from external or unknown computers, host 104c may readily except or trust communications from computers in the same network (e.g., internal network 102).

Figure 3:
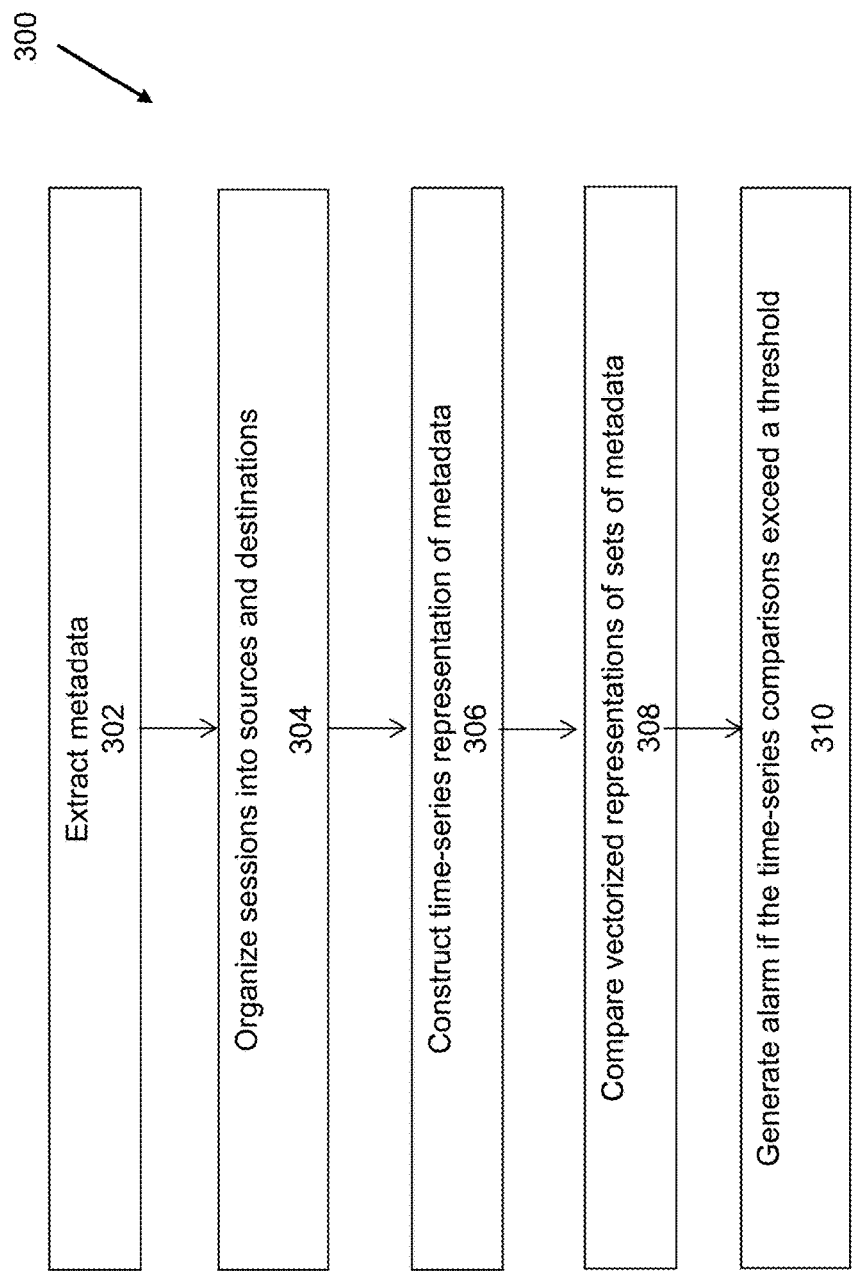
FIG. 3 shows a flowchart of an approach to detect network relays and jump-systems, as according to some embodiments of the invention.

FIG. 3 illustrates a flowchart 300 for a high-level approach for detecting relay attacks (e.g., network attacks that involve the use of a relay host) using network metadata, as according to some embodiments. One of the key principles of this approach is that when a host uses a series of relays or jump-systems to indirectly access another host or resource, there will be a similarity in network behavior across the legs of the relay. As an example, this means that if Host A is using Host B as a relay host to reach Host C, then the network communication exchanged between Host A and Host B will be similar to the network communication exchanged between Host B and Host C.

Metadata is first received from the network. The nodes are then organized into sets of pairs, where each pair of nodes share a common node (e.g., Nodes A and B and Nodes B and C both share communication with Node B). A time-series representation of metadata of each pair is constructed and then converted into a vector representation so that a similarity value may be calculated between the vectorized time-series representations. If the similarity value between the pair of nodes passes a certain threshold value, then an alarm is generated and the set of pair of nodes may be a part of a relay system (e.g., the common node that is shared between the pair of nodes is a potential relay).

At 302, metadata will be extracted from the network. The traffic from the network may be received for analysis. In some embodiments (as described above), the network traffic may be received by tapping a network device such as a network switch. All communication exchanged between hosts are captured by parsing modules and distilled into metadata. This metadata may, in some embodiments, comprise information that describes the network communications without requiring the content or the packets of the network communication to be inspected. Further, one or more metadata may be extracted from the network communications and used for further analysis. This metadata is generated periodically for each ongoing network session between two hosts.

At 304, the metadata is organized into sessions that correspond to a pair of nodes which share a common node. The sessions are organized into groups of likely candidates for sources and likely candidates for destinations by looking at the source and destination of the communications within the sessions.

At 306, a time-series representation of the metadata is constructed for the sessions. The time-series representation maps the metadata corresponding to network behavior between a pair of nodes such that pairs of time-series representations may be aligned together for comparison. In some embodiments, the time-series representation may be mapped onto corresponding locations along a first axis with a height along a second axis. As an example, the first axis may correspond to time and the second axis may correspond to network attributes such as bytes sent and/or bytes received. The time-series representations are then converted into vectorized time-series representations of sessions. The details of creating the time-series representation will be further described below in FIG. 5 and FIGS. 6A-E.

At 308, a comparison is made between the vectorized time-series from the destination groups with the time series from the source groups. The comparison is made to find similarities/differences between vector representations of sessions. In some embodiments, vector comparison metrics such as cosine similarity is used to quantify how close two given sessions are in their actor-behavior space. In some embodiments, a similarity value is computed which represents the similarity between two given sessions.

In some embodiments, it may be possible that due to system delays and other extraneous errors, the time-series representation of two traffic streams may not be perfectly aligned. This may lead to errors when comparing them to each other. The system recognizes these irregularities and variations as jitters and accounts for them by performing a series of comparisons between two time-series at various small temporal offsets and then selecting the best results from the comparisons. In some embodiments, the identification of threats can involve further higher order factors such as persistent observation of the relay activity. A process of comparing shifted representations between two time-series representations of metadata will be further described in FIG. 7 and FIG. 8

At 310, if the similarity value indicates that the network communication is likely to be part of a relay attack, alarms may be generated to alert network administrators of the potential malicious activity. In some embodiments, the alerts are generated when the similarity value exceeds a threshold.

In some embodiments, certain nodes and connections may be prioritized for processing. Extraneous indicators for prioritizing nodes and connections may include nodes that are likely to be problematic or nodes that correspond to high value targets (e.g., confidential information). These indicators can include other types of detected threats, such as specific behaviors known to precede establishing of relays, targets and sources of previously detected relays (e.g., to look for the entire chain).

Figure 4:
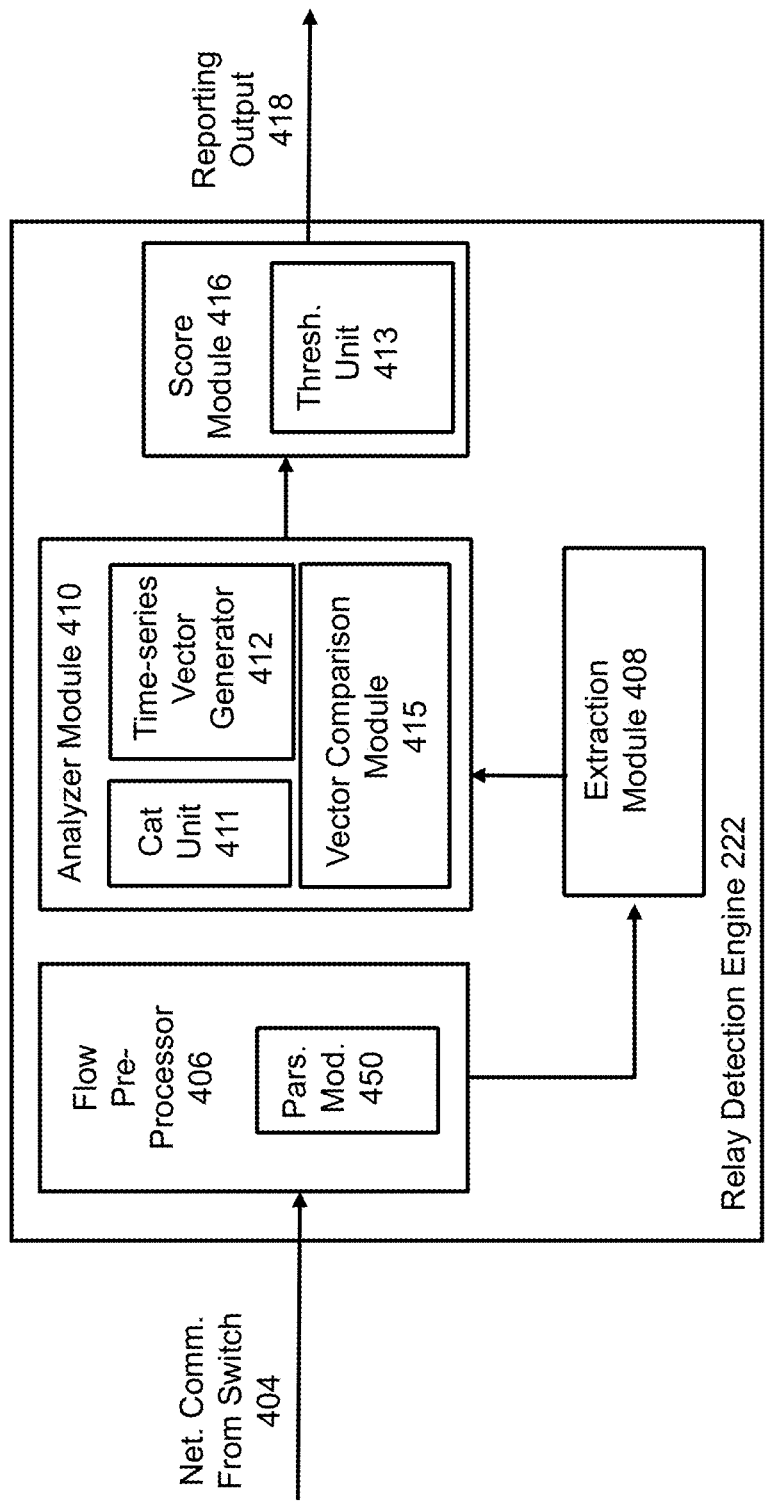
FIG. 4 illustrates internal aspects of the relay detection engine, as according to some embodiments.

FIG. 4 illustrates internal aspects of the relay detection engine, as according to some embodiments. At 404, the relay detection engine 222 may receive traffic for the internal network 202 through the above-disclosed means, such as through a network switch TAP. A flow pre-processor module 406 may use a parsing module or unit 450 that can analyze the network traffic and divide or break it up into unidirectional flows (e.g., outgoing, incoming) and session datasets. In some embodiments, the parsing module utilizes packet information, such as source and destination address to parse the network traffic into the flows.

An extraction module 408 extracts network metadata that describes the network traffic or flows. In some embodiments, the metadata may comprise the amount of bytes in a flow, the first N bytes of a flow (e.g., the first 16 bytes of a flow), the source address, the destination address, variations in flow/packet size, or other statistical data that may be used as metadata to describes the flows without requiring deep content inspection of the packets.

An analyzer module 410 may employ a categorization unit 411 that uses the metadata to categorize the flows into one or more known network attribute criteria and time-series vector generator 412 to create quantitative abstractions of the metadata that capture actor behavior. The analyzer module 410 may comprise at least a categorization unit 411, a time-series vector generator 412, and a vector comparison module 415.

In some embodiments, the categorization unit 411 uses the incoming-flow metadata and outgoing flow metadata to categorize the flows into one or more behavior groups. In some embodiments, the incoming flow metadata and the outgoing-flow metadata are combined to generate global session data. The global session data may then also be used to categorize the network traffic into one or more behavior groups, as further described below.

In some embodiments, the time-series vector generator 412 converts the time-series representations of metadata into a fixed length vector. The metadata is projected into a vector where it can be compared by the vector comparison module 415 to find similar projections from other sessions. Further details about how to create the vectorized representations are described in further detail in FIG. 5 and FIG. 6A-6I.

A vector comparison module 415 finds similarities between vector representation of sessions by calculating a similarity value between the vectorized representation of metadata sessions. The vector comparison module may use any suitable vector comparison metric such as cosine similarity to calculate a comparison value between vector representations. The comparison values can be used to determine which network traffic connections are being controlled by a common actor and may in fact be part of a chain of connections connecting one host to another via a series of intermediate hosts.

A score module 416 may use a threshold unit 413 that may retrieve past historical data from one or more storage devices and determine whether one or more sessions are likely to be part of a network attack using relays. In some embodiments, the historical data is retrieved and a comparison may be performed between the most recent session categorization (e.g., for a given pair of hosts) and past historical activity. From comparison, if it is determined that the behavior is equal to or beyond a relay threshold limit, then an alarm (e.g., alarm data, reporting data, output data) may be generated and output at 418. In some embodiments, when a session is categorized as a type recognized relay behavior, a data structure (e.g., reference counter) may be updated that corresponds to the involved hosts. If the reference counter is equal to or surpasses a threshold limit, then an alarm (e.g., alarm data, reporting data) may be generated and output at 418.

Figure 5:
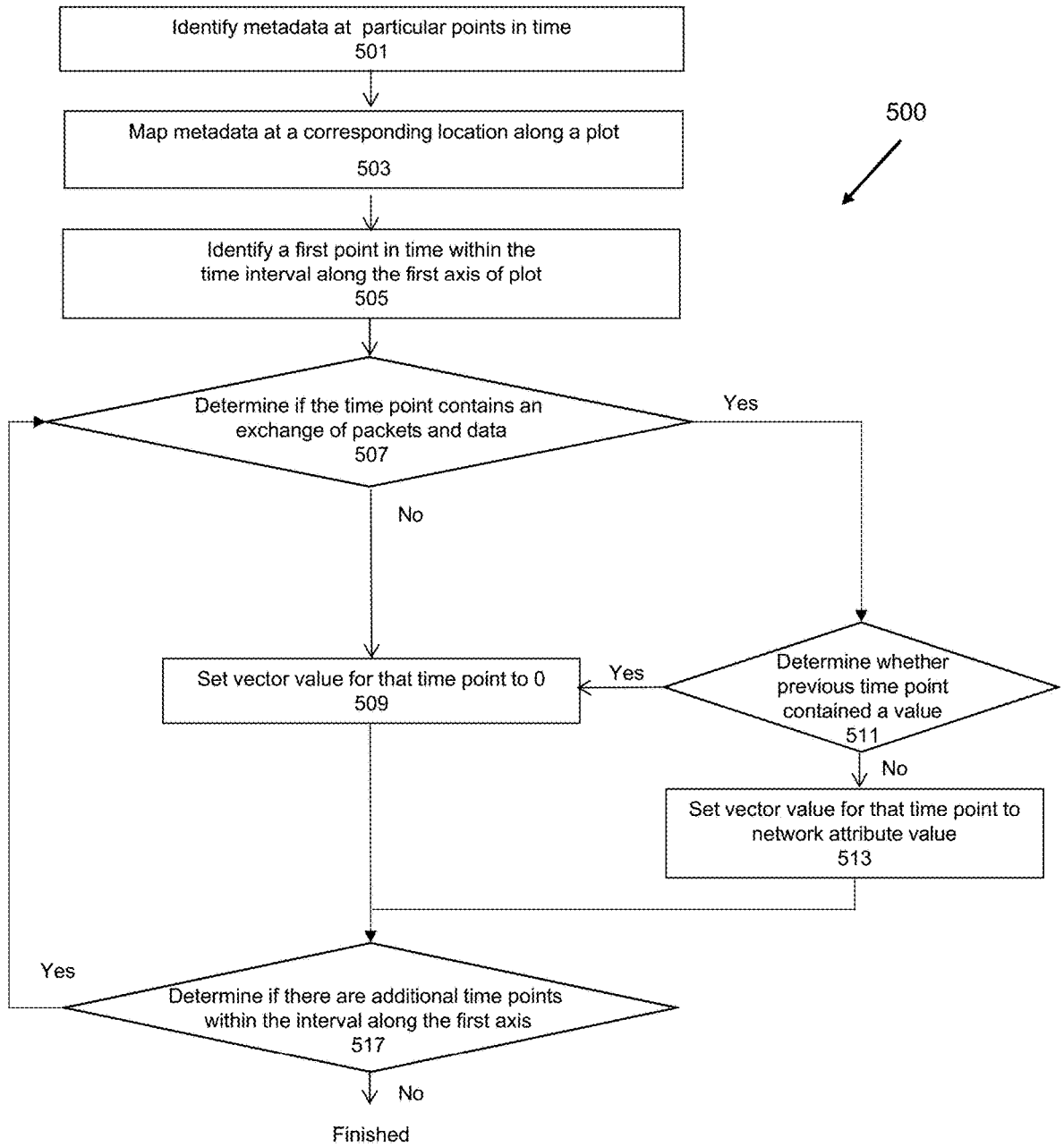
FIG. 5 is a flowchart of an approach to construct time-series representation of metadata, as according to some embodiments.

FIG. 5 shows a flow for an approach for constructing time-series representations of metadata. The time-series representations of metadata allow sessions to be measured and compared to other sessions.

At 501, network metadata is identified at particular points in time. The metadata may be received for analysis from the network traffic. In some embodiments (as described above), the network traffic may be received by tapping a network switch.

Next, at 503, the network metadata is mapped at a corresponding location along a first axis and a second axis. The first axis corresponds to time periods (e.g., a minute) that comprises of smaller time points (also known as bins of time) that represent a small interval of time (e.g., 1 second). The second axis corresponds to values that correspond to different network attributes. For example, network attributes may correspond to criteria such as the number of events per time period, the pattern of distribution of events, the bytes sent or received, and/or a relative/ratio between bytes sent and received.

At 505, a first time point within a time period along the first axis of the plot is identified. At 507, a determination is made if the time point contains an exchange of packets and data. If there was no exchange of data in the time point, then the value in the vector, for this time point, is set to 0 at 509. However, if there was an exchange of packets and data for the time period, then, at 511, a further determination is made whether the previous time point corresponds to a network attribute value (e.g., the value of the vector is not 0). If the previous time point does not contain a value, then plot the point along a y axis that corresponds to the network criteria, at 513. If the previous time point does contain a value, then set the vector value for that time point to 0, at 509. If step 507 is being executed for an initial time point within the time interval (e.g., there is no previous time point), then set the vector value for that time point to the network attribute value.

At 517, a determination is made if there are any additional intervals along the first axis that have not been analyzed to see if the interval contained an exchange of packets and data. If it is determined that there are no more additional intervals, then the method is finished. However, if it is determined that there are additional intervals that have not been analyzed then the flow chart loops back to 507 and a determination is made if the time point contains an exchange of packets and data.

FIG. 6A-6I illustrates an example of a creation of a time series representation of metadata.

Figure 6A:
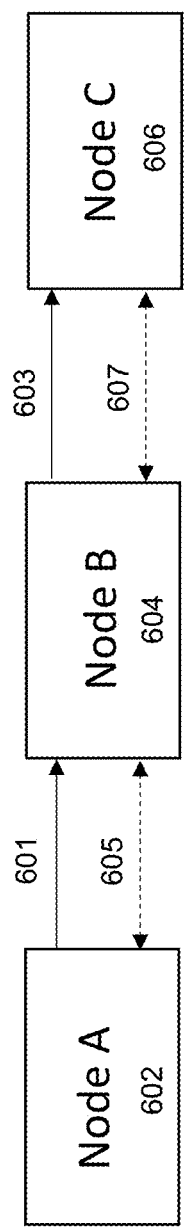

In FIG. 6A, the system identifies combinations of sources and destinations for a node. In this example, Node B is a common node between communications for Node A to Node B and Node B to Node C. As previously explained, the detection system and method is based at least in part on a key principle that when an actor uses a series of relays or jump-systems to indirectly access a target network resource, network behavior between a pair of nodes will permeate across all legs of the relay. In this example, the communications between Node A to Node B (601) and Node B to Node C (603) will be measured and organized around Node B to determine the similarities in network behavior over a period of time between the pairs of nodes.

In this particular example, the communication (e.g., 601, and 603) exchanged between hosts (e.g., Node A, Node B, and Node C) are captured by packet analyzers 609 and distilled into metadata. The distillation is performed at a pre-determined resolution by aggregating packet statistics into a series of time bins. These aggregate statistics include number of packets exchanged between the host at that time point, sum of bytes exchanged in that time point, and many other stats. In some embodiments, the time point intervals may be less than a second.

Figure 6B:
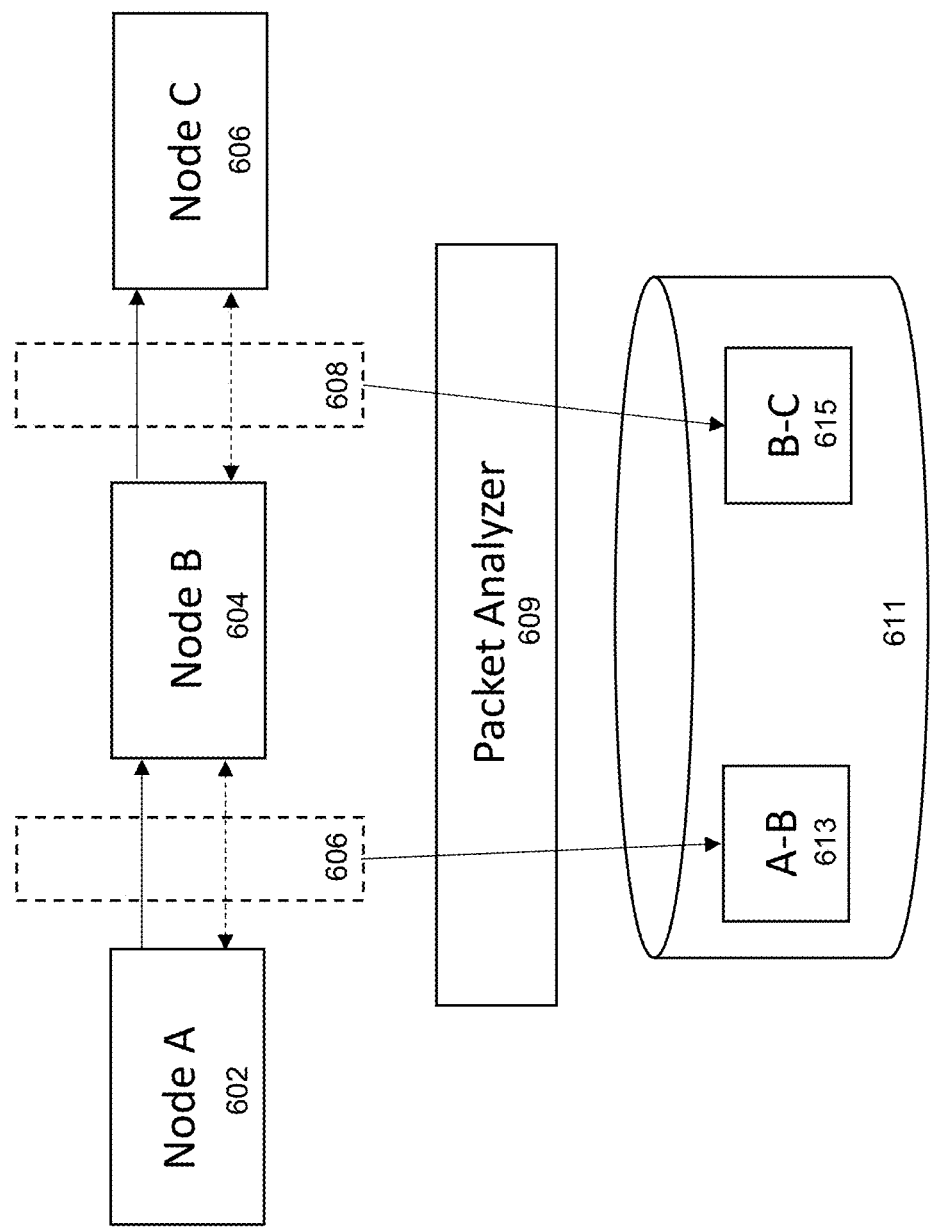

As depicted in FIG. 6B, once the sources (e.g., Node A to Node B) and destinations (Node B to Node C) relative to Node B are identified, a network security device such as a packet analyzer 609 may be employed to organize and capture all network packets between Node A to Node B 601 and 605 and from Node B to Node C 603 and 607. The packet analyzer may access and create a copy of the network communications by performing a packet capture and saving metadata corresponding to the network communications in one or more packet capture files to the database 611. When the network packets are received, the network communications may be parsed into flows that correspond to sessions (e.g., 613 and 615). In some embodiments, the packet analyzer corresponds to a network sniffer.

Figure 6C:
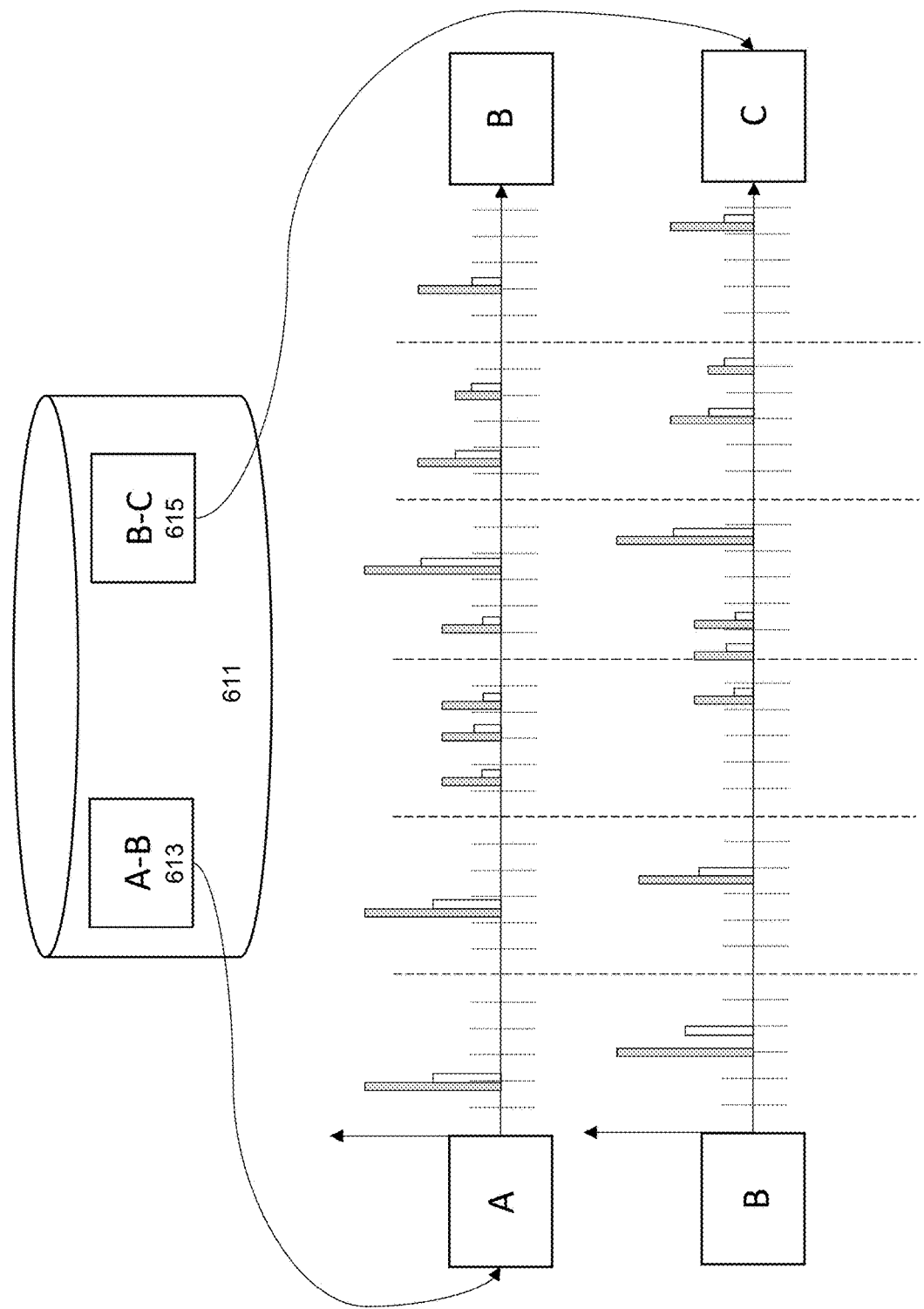

FIG. 6C shows the system adding a new layer of abstraction onto the metadata by creating time-series representations of the metadata for communications between Nodes A to B and Nodes B to C. Here, the metadata corresponding to network traffic between Node A and B 613 and the metadata corresponding to network traffic data between Node B and C 615 are mapped onto corresponding locations along a first axis with a height along a second axis. In some embodiments, the first axis corresponds to time and the second axis corresponds to network attributes. In the example in FIG. 6C, the network attributes corresponds to bytes received and bytes sent. Therefore, the mapped points of Node A and B 613 indicate bursts of activity (e.g., bytes sent from A to B or bytes received from A to B) and periods of inactivity between Nodes A and B. If Node B is indeed being controlled by Node A to reach Node C, then the same bursts of activity (e.g., bytes sent from B to C or bytes received from B to C) and same periods of inactivity between nodes B and C should be reflected in the network behavior over a time period between Node B and C 615.

Figure 6D:
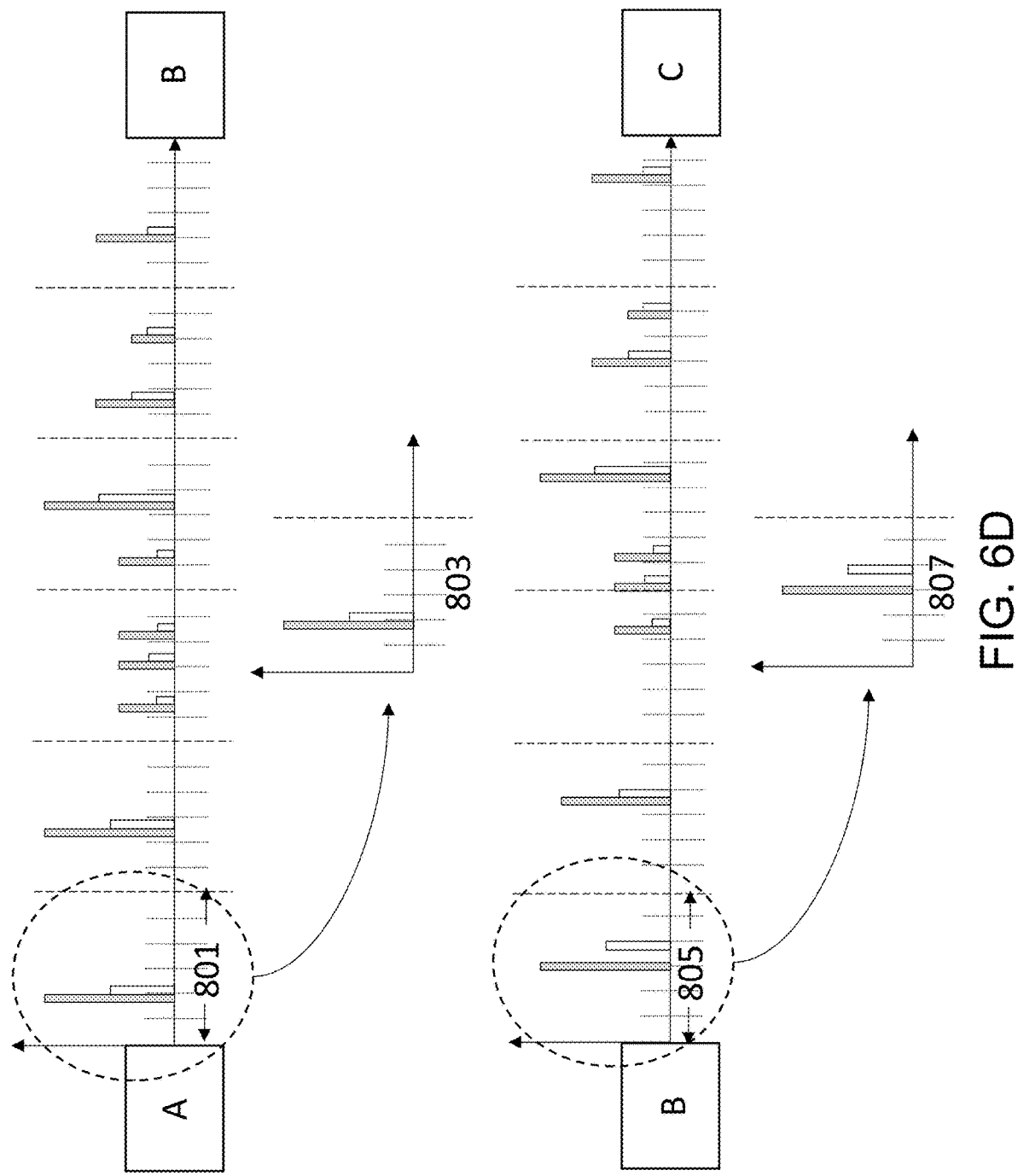

FIG. 6D shows selecting a specific time window from the plot for analysis. In this example, the time interval 801 may be a minute long. The time interval 801 is made up of smaller time points that correspond to bins of time. Here, the time interval 803 corresponds to the first time period between an exchange of packets between the source (e.g., Nodes A and B) is selected. Accordingly, a similar time interval 807 that correlates to the destination (e.g., Nodes B and C) is also selected for analysis.

FIG. 6E-J shows an example of converting the time-series representation of the specific time window. The time-series representation of 803*a* corresponds to the data exchanged between Nodes A and B, whereas the time-series representation of 807*a* corresponds to the data exchanged between Nodes B and C.

In one embodiment and for illustrative purposes only, a value of 1 will be entered when there is any indication of data exchanged and a value of 0 will be entered when there is no indication of data exchanged. Alternatively, other vector values besides 1s and 0s may be used, particularly, using a value (e.g., bytes sent or bytes received) that corresponds to network data behavior instead of 1.

FIG. 6E depicts identifying an initial time point within the time interval along the first axis. Here, a determination is made that there are no packets or data that is exchanged at the initial time point in both 803*a* and 807*a*. As such, the vector value for the time points in 803*a* and 807*a* is set to 0. A determination is then made as to whether there are additional time points within the interval along the first axis. Here, there are additional time points within the interval along the first axis.

FIG. 6F depicts identifying the next time point within the time period. In 803*a*, there is an exchange of packets and data, so a determination is made as to whether the previous point contained a value. Here, the previous time point (e.g., the initial time point in FIG. 6E) did not contain a value so the vector value for the current time point is set to 1. In 807*a*, there are no packets or data that is exchanged at this time point so the value of the time point is set to 0. Then, as explained above, it is determined that there are additional time points within the interval along the first axis.

FIG. 6G depicts identifying the next time point within the time period. In 803*a*, packets and data are exchanged at this time point, so a determination is made as to whether the previous point contained a value. Here, the previous time point (e.g., the time point in FIG. 6F) contains a value. This means that the vector value for this time point is set to 0 despite the fact that there are packets and data exchanged at this time point. In some embodiments, a value other than 0 may set when there are packets and data exchanged at this time point. In 807*a*, the vector value for this time point is set to 1 because there are packets and data exchanged at this time point and the previous time point (e.g., the time point in FIG. 6F) did not contain a value. Again, a determination is made as to whether there are additional time points left in the time period to analyze.

FIG. 6H depicts identifying the next time point within the time period. In 803*a* and 807*a*, both time points indicate that data is exchanged. However, a value of 0 is set for this time point because the previous time point (e.g., time point in FIG. 6G) contained a value. The next time point is analyzed because there are additional time points within the interval.

FIG. 6I depicts identifying the next time point within the time period. In 803*a*, the time point contains a new exchange of packets and data so there is an additional check to determine whether the previous time point (e.g., time point in FIG. 6H) contained a value. Here, the previous time point did not contain a value so the vector value of the time point is set to 1. In 807*a*, there is an exchange of packets and data, but the time point for this value is set to 0 because previous time point (e.g., time point in FIG. 6H) contained a value. The vectorized representation is completed because there are no more additional time points within the interval along the first axis.

As previously explained, for illustrative purposes only, a vector values of 0 or 1 are assigned to the time point depending on data and packets. However, it should be clear that the vector values are not necessarily limited to values of 1s and 0s. In some embodiments, the vector values may be set to any scalar value or vector of values that correspond to network attributes.

In some embodiments, the network attributes that are measured on the second axis may correspond to network measurements such as density (e.g., number of events per time period), a pattern distribution of events, size of bytes sent and received, or relative ratio between the bytes sent and received. The different network attributes may be calculated for the same session and may be normalized and combined together to create an overall score. This process is further explained in further detail in FIG. 9.

Figure 7:
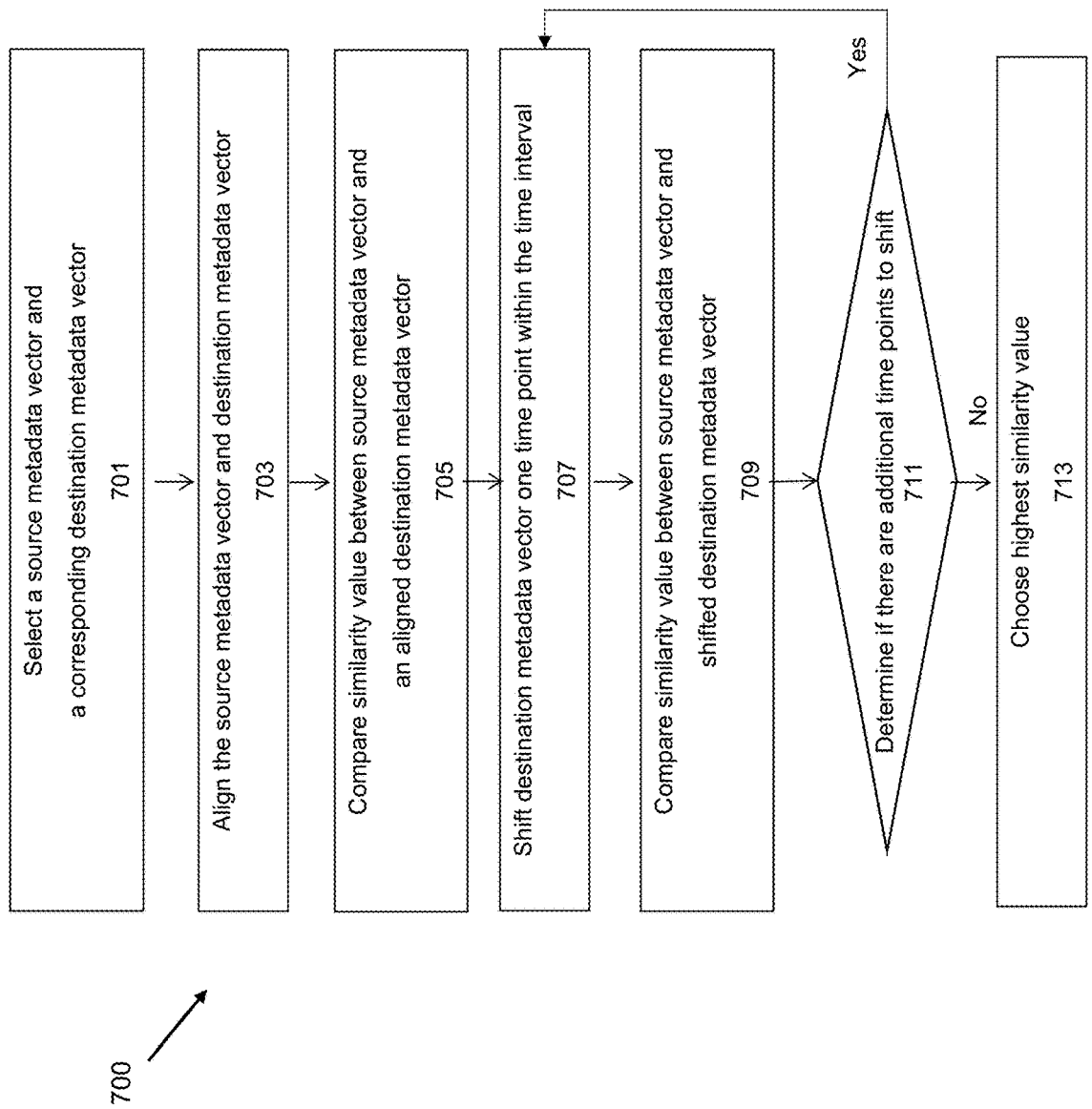
FIG. 7 is a flowchart of an approach to compare vectorized time-series representations of metadata, as according to some embodiments.

FIG. 7 shows a flow for an approach for comparing time-series representations of the destination group to the source groups.

At 701, a particular time interval is selected to determine the similarities between the representations of a source metadata vector (e.g., first leg of communication) and a corresponding destination metadata vector (e.g., second leg of communication). The source metadata vector and the destination metadata vector are first aligned according to the time intervals to determine a similarity value between the two vectors at 703. At 705, vector comparison metrics such as cosine similarity may be used to quantify how similar the two given sessions are in their network behavior. Any suitable vector comparison method may be utilized.

In some embodiments, the time-series representations may not be perfectly aligned, which may lead to errors when comparing them with each other. As such, at 707, the system recognizes these irregularities and variations as jitters and accounts for them by shifting the destination metadata vector to better align the two sessions. When the two vectorized sessions do not perfectly align, the destination metadata will be shifted one time point in either direction. In some embodiments, the source metadata vector may be shifted instead of the destination metadata vector for alignment purposes.

At 709, a comparison value (e.g., similarity value and/or difference value) is calculated between the source metadata vector and the shifted destination metadata vector. At 711, a determination is made to see whether there are additional shifts left for the destination metadata vector to be shifted to. By performing a series of comparisons between the source metadata vector and the destination metadata vector, the best result can then be selected from the shifted alignments, at 713.

Figure 8:
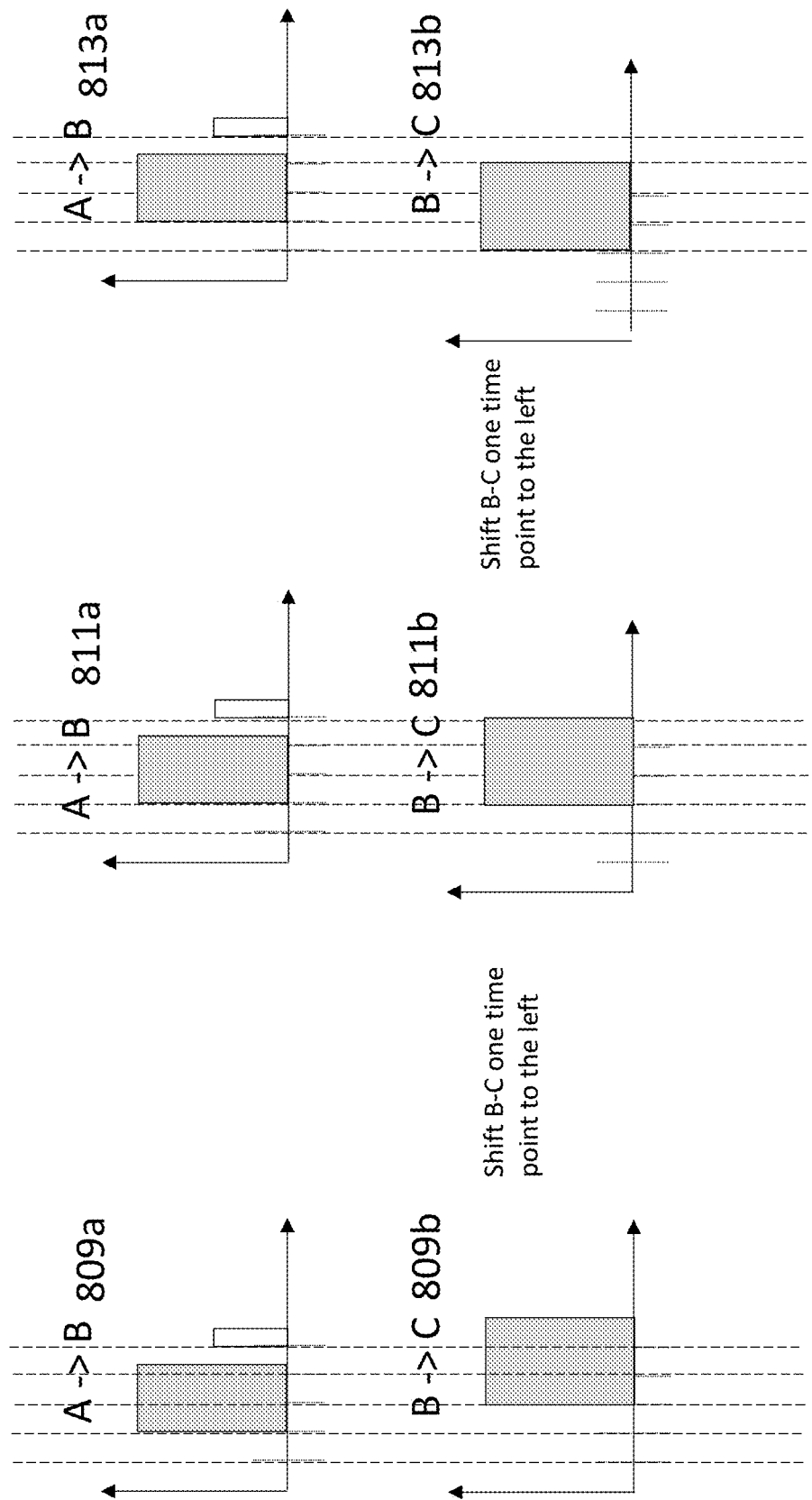
FIG. 8 illustrates an approach to compare time-series representations of metadata, as according to some embodiments.

FIG. 8 illustrates an example of a comparison of a shifted time series representations of network metadata. FIG. 8 shows different shifted alignments (e.g., 809, 811, and 813) between the network behavior between a representation of network behavior between Nodes A to B and a shifted representation of network behavior between Nodes B to C. A similarity value may be calculated from the each shifted comparison, where each shifted comparison corresponds to a source metadata vector that is stationary and a destination metadata vector that is shifted at least a time point. The similarity value corresponds to the similarity in match between a source metadata vector and a destination metadata vector. In some embodiments, an individual score may be further calculated from the similarly value.

In other embodiments, a phase-locked loop may be implemented to compare the vector representations. A phase-locked loop may be useful to use when large networks of computers are involved such that a comparison and computation of similarity values is computationally expensive.

In some embodiments, an overall score is calculated by aggregating normalized individual scores corresponding to different matches between the pair of nodes within a single time period. An overall score reflects whether there is persistence of match activity over a period of time. If the overall score (e.g., persistence of match) is beyond a threshold, then an alert is generated. In some embodiments, the alert is based at least on the frequency of the matches between particular nodes within a time interval. In some embodiments, the overall score can also take into account the irregularities and jitters.

In some embodiments, a correlation scheme may be implemented to apply weightings for a scoring system. The individual scores correspond to scores for the same time-series representation but with different network criteria applied. In some embodiments, these individual scores may be normalized before they can be compared to each other. The weights for particular criteria are applied to the individual score(s). As an example, the pattern of distribution of events score may be more heavily weighted than the number of events per time period criteria. Then, the value (e.g., numerical value) of the weighting is aggregated. If the aggregated weighted scores surpass a threshold, then, a global signal indicating a positively identified relay or jump-system communication and/or alert data is generated. However, if the threshold is not surpassed then the network data (e.g., sessions) is ignored.

In some embodiments, the identification of threat can involve further higher order factors like persistent observation of the relay activity. Hosts and connections may be prioritized for processing based at least on using extraneous indicators of threat. When large networks of computers are involved the disclosed invention will monitor extraneous indicators of threat and accordingly prioritize hosts and connections for processing. In some embodiments, the extraneous indicators can include other types of detected threats, specific behaviors known to precede establishing of relays, targets, and sources of previously detected relays.

In addition, the system can look for chains of relays by comparing relays detected on multiple hosts to see if destinations or destination connections of one host was flagged as a source or source connection of another host. The scores and alerts between pairs of nodes may be saved into a database. This allows detection of entire chains of relay communication.

System Architecture Overview

Figure 9:
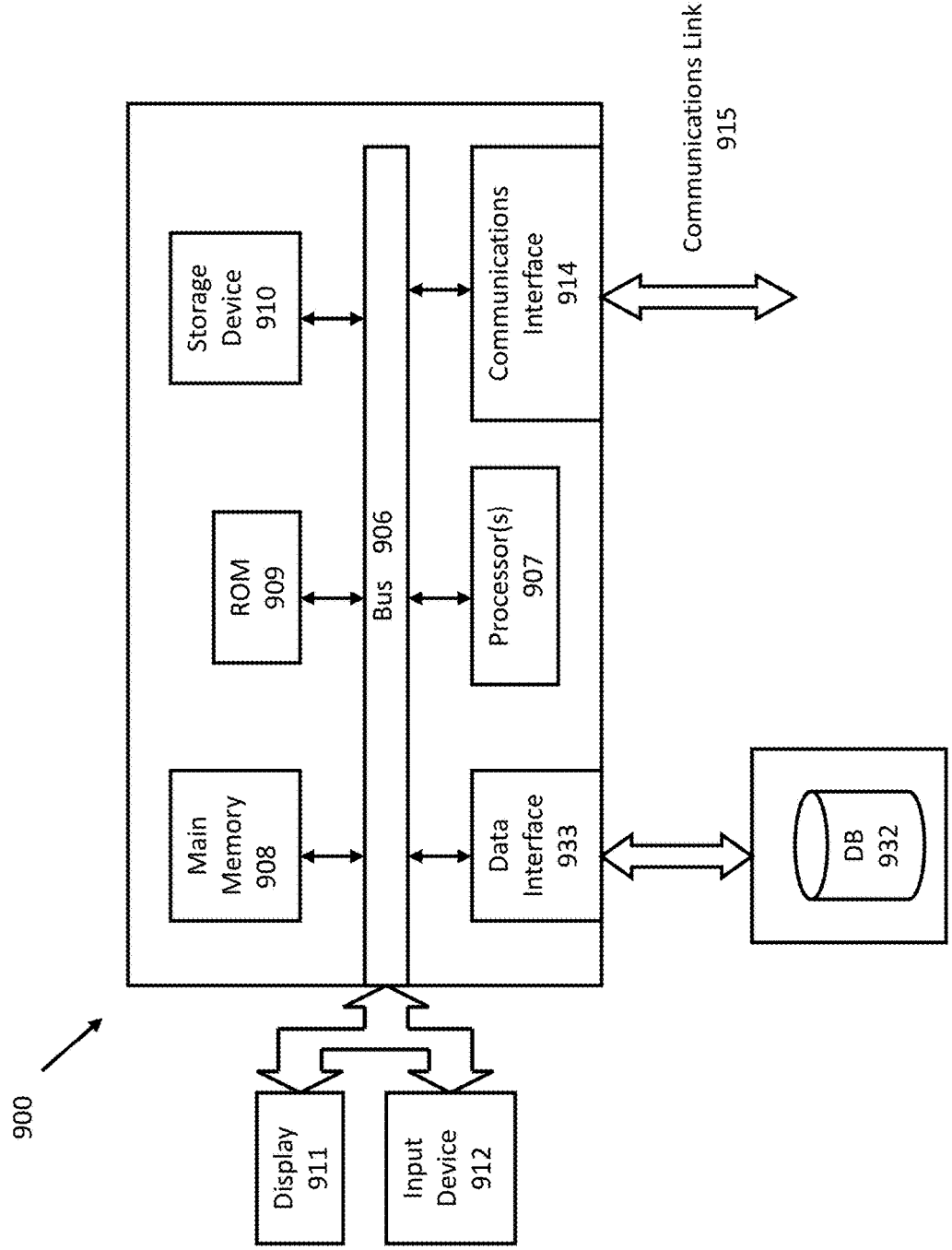
FIG. 9 is a block diagram of an illustrative computing system suitable for implementing an embodiment of the present invention.

FIG. 9 is a block diagram of an illustrative computing system 900 suitable for implementing an embodiment of the present invention for performing intrusion detection. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control. A database 932 may be accessed in a storage medium using a data interface 933.

According to one embodiment of the invention, computer system 900 performs specific operations by processor 907 executing one or more sequences of one or more instructions contained in system memory 908. Such instructions may be read into system memory 908 from another computer readable/usable medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for identifying malicious network communications comprising:
   receiving network traffic of a network;
   extracting a set of metadata from the network traffic, the set of metadata representing network traffic between respective pairs of nodes of a plurality of pairs of nodes; and
   detecting a common node acting as a relay on the network, the common node being a common to a source node and a destination node, detecting the common node acting as a relay by at least:
      generating a source time series vector representing network traffic between the source node and the common node based on the set of metadata and a destination time series vector representing network traffic between the common node and the destination node based on the set of metadata,
      generating a plurality of similarity scores by comparing the source time series vector and the destination time series vector, wherein the similarity scores correspond to a similarity of network behavior across legs of a potential relay arrangement, and
      generating an alarm when a similarity score of the plurality of similarity scores is beyond a threshold, the alarm indicating that the common node is part of a relay arrangement.

2. The method of claim 1, wherein a first similarity score of the plurality of similarity scores is generated based on a source time series vector and a destination time series vector before any temporal offset is applied to the source time series vector or the destination time series vector and a second similarity score of the plurality of similarity scores is generated after applying a temporal offset to the source time series vector or the destination time series vector.

3. The method of claim 1, wherein the network traffic between the source node and the common node consists of network traffic from the source node and to the common node, and the network traffic between the common node and the destination node consists of network traffic from the common node and to the destination node.

4. The method of claim 1, wherein the set of metadata is organized into different sessions, the source time series vector corresponds to a first session, and the destination time series vector corresponds to a second session.

5. The method of claim 1, further comprising:
   detecting a second common node acting as a second relay on the network, the second common node being common to a second source node and a second destination node, detecting the second common node acting as a relay by at least:
      generating a second source time series vector representing network traffic between the second source node and the second common node based on the set of metadata and a second destination time series vector representing network traffic between the common node and the destination node based on the set of metadata, and
      generating a second plurality of similarity scores by comparing the second source time series vector and the second destination time series vector, at least one second similarity score of the second plurality of similarity scores is generated after applying a temporal offset to the second source time series vector or the second destination time series vector, and
      generating a second alarm when a second similarity score of the second plurality of similarity scores is beyond a threshold, the second alarm indicating that the second common node is part of a relay arrangement.

6. The method of claim 1, wherein the source node, the common node, or the destination node is external to the network.

7. The method of claim 1, wherein the source node, the common node, or the destination node is in a partitioned area of a network, and only a subset of nodes internal to the network have a trust-permission to access the partitioned area of the network.

8. A computer program product embodied on a non-transitory computer readable medium having stored thereon a sequence of instructions which, when executed by a processor causes the processor to execute a set of acts for identifying malicious network communications, the set of acts comprising:
   receiving network traffic of a network;
   extracting a set of metadata from the network traffic, the set of metadata representing network traffic between respective pairs of nodes of a plurality of pairs of nodes; and
   detecting a common node acting as a relay on the network, the common node being a common to a source node and a destination node, detecting the common node acting as a relay by at least:
      generating a source time series vector representing network traffic between the source node and the common node based on the set of metadata and a destination time series vector representing network traffic between the common node and the destination node based on the set of metadata, generating a plurality of similarity scores by comparing the source time series vector and the destination time series vector, wherein the similarity scores correspond to a similarity of network behavior across legs of a potential relay arrangement, and generating an alarm when a similarity score of the plurality of similarity scores is beyond a threshold, the alarm indicating that the common node is part of a relay arrangement.

9. The computer program product of claim 8, wherein a first similarity score of the plurality of similarity scores is generated based on a source time series vector and a destination time series vector before any temporal offset is applied to the source time series vector or the destination time series vector and a second similarity score of the plurality of similarity scores is generated after applying a temporal offset to the source time series vector or the destination time series vector.

10. The computer program product of claim 8, wherein the network traffic between the source node and the common node consists of network traffic from the source node and to the common node, and the network traffic between the common node and the destination node consists of network traffic from the common node and to the destination node.

11. The computer program product of claim 8, wherein the set of metadata is organized into different sessions, the source time series vector corresponds to a first session, and the destination time series vector corresponds to a second session.

12. The computer program product of claim 8, further comprising:

detecting a second common node acting as a second relay on the network, the second common node being common to a second source node and a second destination node, detecting the second common node acting as a relay by at least:

generating a second source time series vector representing network traffic between the second source node and the second common node based on the set of metadata and a second destination time series vector representing network traffic between the common node and the destination node based on the set of metadata, and generating a second plurality of similarity scores by comparing the second source time series vector and the second destination time series vector, at least one second similarity score of the second plurality of similarity scores is generated after applying a temporal offset to the second source time series vector or the second destination time series vector, and generating a second alarm when a second similarity score of the second plurality of similarity scores is beyond a threshold, the second alarm indicating that the second common node is part of a relay arrangement.

13. The computer program product of claim 8, wherein the source node, the common node, or the destination node is external to the network.

14. The computer program product of claim 8, wherein the source node, the common node, or the destination node is in a partitioned area of a network, and only a subset of nodes internal to the network have a trust-permission to access the partitioned area of the network.

15. A system for detecting threats on a network, comprising:

a computer processor to execute a set of program code instructions;

a memory to hold the set of program code instructions, in which the set of program code instructions comprises program code to perform:

receiving network traffic of a network;

extracting a set of metadata from the network traffic, the set of metadata representing network traffic between respective pairs of nodes of a plurality of pairs of nodes; and detecting a common node acting as a relay on the network, the common node being a common to a source node and a destination node, detecting the common node acting as a relay by at least:

generating a source time series vector representing network traffic between the source node and the common node based on the set of metadata and a destination time series vector representing network traffic between the common node and the destination node based on the set of metadata, generating a plurality of similarity scores by comparing the source time series vector and the destination time series vector, wherein the similarity scores correspond to a similarity of network behavior across legs of a potential relay arrangement, and generating an alarm when a similarity score of the plurality of similarity scores is beyond a threshold, the alarm indicating that the common node is part of a relay arrangement.

16. The system of claim 15, wherein a first similarity score of the plurality of similarity scores is generated based on a source time series vector and a destination time series vector before any temporal offset is applied to the source time series vector or the destination time series vector and a second similarity score of the plurality of similarity scores is generated after applying a temporal offset to the source time series vector or the destination time series vector.

17. The system of claim 15, wherein the network traffic between the source node and the common node consists of network traffic from the source node and to the common node, and the network traffic between the common node and the destination node consists of network traffic from the common node and to the destination node.

18. The system of claim 15, wherein the set of metadata is organized into different sessions, the source time series vector corresponds to a first session, and the destination time series vector corresponds to a second session.

19. The system of claim 15, wherein the source node, the common node, or the destination node is external to the network.

20. The system of claim 15, wherein the source node, the common node, or the destination node is in a partitioned area of a network, and only a subset of nodes internal to the network have a trust-permission to access the partitioned area of the network.

* * * * *